(12) United States Patent
Hagen et al.

(10) Patent No.: US 10,808,525 B2
(45) Date of Patent: Oct. 20, 2020

(54) ALTERNATING POLARITY OF CASING-SIDE ANTENNAS IN A WELLBORE

(71) Applicant: Halliburton Energy Services, Inc., Houston, TX (US)

(72) Inventors: Trond Hagen, Sandefjord (NO); Christopher Milton, Tonsberg (NO)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/324,250

(22) PCT Filed: Dec. 26, 2017

(86) PCT No.: PCT/US2017/068420
§ 371 (c)(1),
(2) Date: Feb. 8, 2019

(87) PCT Pub. No.: WO2019/132859
PCT Pub. Date: Jul. 4, 2019

(65) Prior Publication Data
US 2019/0360327 A1 Nov. 28, 2019

(51) Int. Cl.
*E21B 47/13* (2012.01)
*H01Q 1/22* (2006.01)
(Continued)

(52) U.S. Cl.
CPC .............. *E21B 47/13* (2020.05); *H01Q 1/22* (2013.01); *H01Q 7/00* (2013.01)

(58) Field of Classification Search
None
See application file for complete search history.

(56) References Cited

U.S. PATENT DOCUMENTS

| 4,806,928 | A | 2/1989 | Veneruso |
| 7,154,412 | B2 * | 12/2006 | Dodge ................. G01V 11/002 340/854.9 |

(Continued)

FOREIGN PATENT DOCUMENTS

| WO | 9936802 | 7/1999 |
| WO | 2016171679 | 10/2016 |

OTHER PUBLICATIONS

International Patent Application No. PCT/US2017/068420, "International Search Report and Written Opinion", dated Sep. 27, 2018, 12 pages.

*Primary Examiner* — Curtis A Kuntz
*Assistant Examiner* — Jerold B Murphy
(74) *Attorney, Agent, or Firm* — Kilpatrick Townsend & Stockton LLP

(57) ABSTRACT

An antenna system can include casing-side antennas and a full wave rectifier. The casing-side antennas can be coupled to a casing string that is positioned in a wellbore for communicatively coupling to a tubing-side antenna positioned in the wellbore. Each of the casing-side antennas can include a conductive wire positioned to carry current that can be induced on the conductive wire in response to an electromagnetic field from the tubing-side antenna. A direction, relative to a common antenna junction point, of the current on the conductive wire can be opposite to the direction, relative to the common antenna junction point, in which an adjacent casing-side antenna is positioned to carry current induced in response to the electromagnetic field. The full-wave rectifier can be conductively coupled to the casing-side antennas for converting alternating current that can be generated on the casing-side antennas into direct current.

20 Claims, 8 Drawing Sheets

(51) Int. Cl.
  *E21B 17/00*   (2006.01)
  *H01Q 7/00*    (2006.01)

(56) References Cited

U.S. PATENT DOCUMENTS

| | | |
|---|---|---|
| 8,689,621 B2 | 4/2014 | Godager et al. |
| 2004/0238166 A1 | 12/2004 | Salamitou et al. |
| 2006/0038699 A1* | 2/2006 | Dodge ................ G01V 11/002 340/854.8 |
| 2012/0017673 A1 | 1/2012 | Godager et al. |
| 2012/0024050 A1* | 2/2012 | Godager ............ E21B 41/0085 73/152.05 |
| 2014/0293752 A1* | 10/2014 | Fu ......................... G01V 1/184 367/182 |
| 2018/0321411 A1* | 11/2018 | Capoglu ............... E21B 47/123 |

* cited by examiner

ALTERNATING POLARITY OF CASING-SIDE ANTENNAS IN A WELLBORE

TECHNICAL FIELD

The present disclosure relates to communicating with sensors in a wellbore. More specifically, but not by way of limitation, this disclosure relates to alternating the polarity of casing-side antennas in a wellbore.

BACKGROUND

A well (e.g., an oil or gas well for extracting fluid or gas from a subterranean formation) can include a casing string or a casing liner defining a wellbore. Various sensors (e.g., any electronic or electromechanical devices for measuring characteristics of the subterranean formation) and various actuators (e.g., a motor or a solenoid and hydraulics) can be coupled to the casing string and can be referred to as casing-side sensors. In some examples, the casing-side sensors are positioned on an outer surface of the casing string. Positioning the sensors behind or outside of the casing can allow for measurements (e.g., pressure measurements) to be taken with a higher precision. But, positioning the casing-side sensors behind the casing can also present challenges for providing power to the sensor and for communicating the measurements to well operators at the surface. Various intermediate casings can separate the casing-side sensor from the tubing string and tubing-side electronics associated with the tubing string.

DETAILED DESCRIPTION

Figure 1:
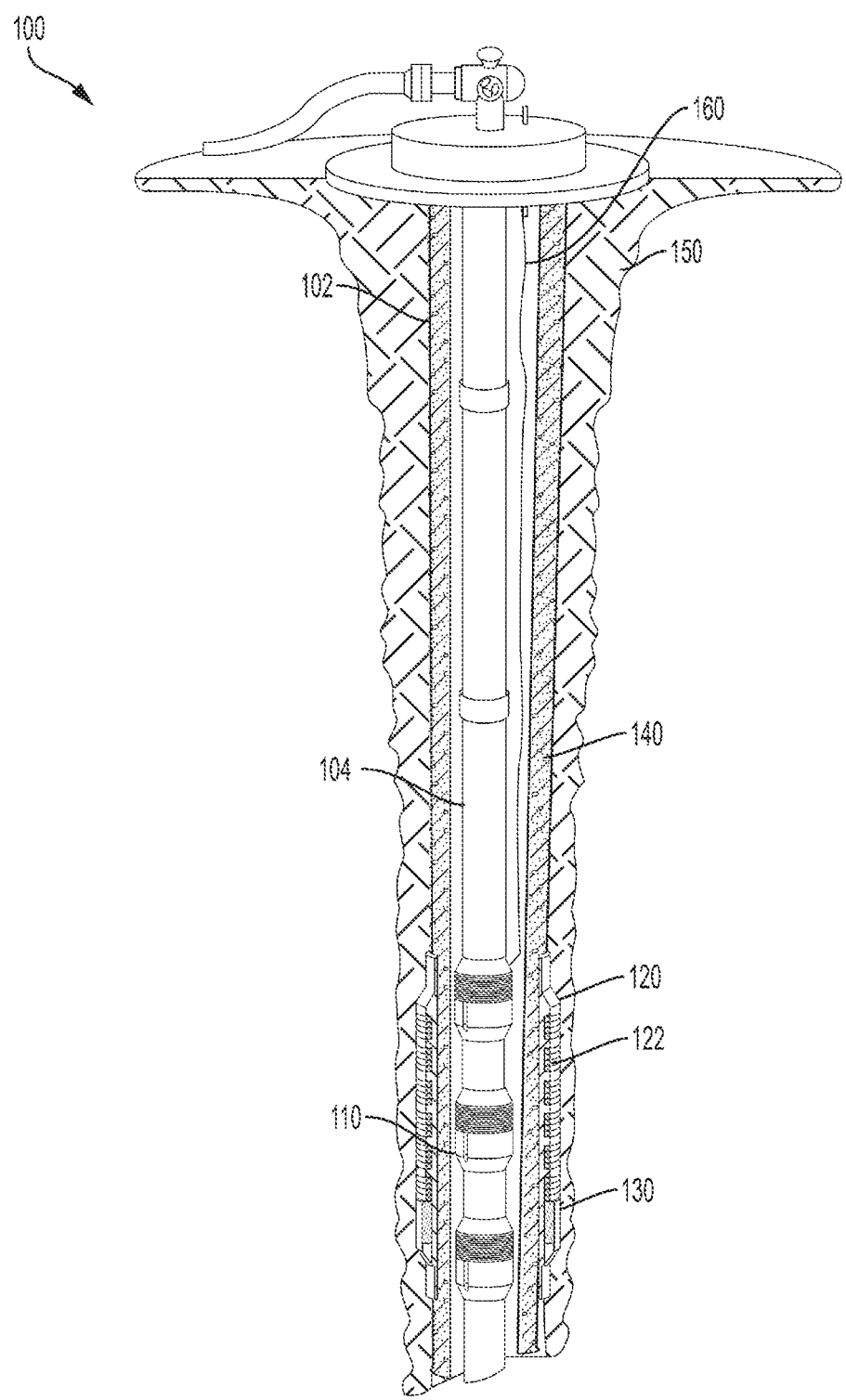
FIG. 1 is a diagram of an example of a well including multiple casing-side antennas for maintaining communication between a tubing-side antenna and a casing-side sensor according to one aspect of the present disclosure.

Certain aspects and features relate to alternating polarity of casing-side antennas in a wellbore for maintaining communication between a tubing-side antenna and a casing-side sensor. Communication can be maintained by preserving a path for communicating data signals for transferring data or communicating power signals for transferring power. In some examples, a casing-side sensor can be coupled to a casing-side antenna stack that includes multiple casing-side antennas. Each casing-side antenna can include conductive wire coiled to generate current in response to an electromagnetic field generated by a tubing-side antenna. Adjacent casing-side antennas can be wound in opposite directions or wound in the same direction and conductively coupled such that the adjacent casing-side antennas have alternating polarities. Current induced on each casing-side antenna in response to the electromagnetic field will be in an opposite direction from current induced on an adjacent casing-side antenna due to the alternating polarity of the adjacent casing-side antennas. The current generated by adjacent casing-side antennas can pass through a full-wave rectifier shared by the adjacent casing-side antennas. The shared full-wave rectifier can convert alternating current ("AC") into direct current ("DC"), which can be provided to the casing-side sensor. Alternating the polarity of adjacent casing-side antennas can reduce losses when shifting from one casing side antenna coil to another, increase available voltage, reduce component costs, and reduce the size of antenna assemblies.

In some aspects, casing-side antennas can include conductive wire wrapped in a coil around the casing string. One or two casing-side antennas can be adjacent to that antenna. Adjacent casing-side antennas can include two casing-side antennas wrapped around two longitudinal positions along the casing string in which there is no other casing-side antenna wrapped around a longitudinal position between the two casing-side antennas. One end of the conductive wire associated with each casing-side antenna can be conductively coupled to a common antenna junction point. The other end of the conductive wire associated with each casing-side antenna can be coupled to a pair of cross-coupled diodes that form half of a full-wave rectifier. In some examples, an antenna system can alternate the polarity of adjacent casing-side antennas by having the conductive wire for a casing-side antenna wrapped or wound clockwise around the casing string and having the conductive wire for an adjacent casing-side antenna wrapped or wound counter clockwise around the casing string. In additional or alternative examples, the conductive wire is wound in the same direction for adjacent casing-side antennas, but opposite ends of the conductive wire are connected to the common antenna junction point. For example, the second end of a clockwise-wound casing-side antenna and the first end of a counter-clockwise wound casing-side antenna can be conductively coupled to a common antenna junction point. The clockwise-wound casing-side antenna can generate a current that travels from a first end of the conductive wire to a second end of the conductive wire in a substantially clockwise direction in response to an electromagnetic field. The counter-clockwise-wound casing-side antenna can generate a current that travels from a first end of the conductive wire to a second end of the conductive wire in a substantially counter-clockwise direction in response to the same electromagnetic field. Current can pass through the two casing-side antenna and the voltage generated across the two casing-side antennas can be additively combined.

Adjacent casing-side antennas will share a full-wave rectifier. For example, a first casing-side antenna can be conductively coupled to a pair of cross-coupled diodes that form half of a full-wave rectifier. A second casing-side antenna, adjacent to the first casing-side antenna, can be conductively coupled to another pair of cross-coupled diodes, which can form the other half of the full-wave rectifier. Alternating current induced on the adjacent casing-side antennas can be converted to direct current by the full-wave rectifier. A casing-side sensor can include an actuator or any suitable electrical or electromechanical device for wirelessly transmitting data (e.g., measurements representing characteristics of a subterranean formation) obtained by the casing-side sensor. A tubing string with a tubing-side antenna mechanically coupled thereto can be positioned in the wellbore such that the tubing-side antenna is within communication range of the casing-side antenna stack. Various forces can shift the position of the tubing string in the wellbore with respect to the casing-side antenna stack such that the tubing-side antenna can move in and out of communication range with one or more casing-side antennas in the casing-side antenna stack. For example, the tubing string can shift in response to changes in temperature, pressure, or fluid flow in a wellbore. In addition or alternatively, the initial space out of the tubing string can result in the relative position of the tubing-side antennas and casing-side antennas being uncertain due to tolerances in measured joint lengths and varying tubing, casing, and drill pipe cross sections. The relative position of the tubing-side antennas and casing-side antennas can also be uncertain due to wall-to-casing friction, casing-to-tubing friction, buoyancy in the wellbore, and other effects causing tubing strings to compress or stretch. Alternating the direction of current in adjacent casing-side antennas and combining the current generated on adjacent casing-side antennas can improve the effective communication range of the casing-side antennas or the distance that the tubing string can be positioned from an alignment with the casing-side antenna stack without losing communication with the casing-side sensor.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a schematic diagram of an example of a well 100 with casing-side antennas 122 for communicating with tubing-side antennas 110. The well 100 includes a wellbore 102 formed through a subterranean formation 150. The wellbore 102 includes the casing string 140, which includes a casing-side sensor 130. A casing-side antenna stack 120, which includes the casing-side antennas 122, is communicatively coupled to the casing-side sensor 130 and included in (or physically coupled to) the casing string 140. A tubing string 104 is positioned in the wellbore, and the tubing-side antennas 110 are included in (or physically coupled to) the tubing string 104. A cable 160 extends from a surface of the wellbore 102 and communicatively couples to the tubing-side antennas 110.

The casing-side antennas 122 each include conductive wire for carrying current induced by an electromagnetic field that can be generated by the tubing-side antennas 110. In some examples, the conductive wire for each of the casing-side antennas 122 is coiled around an outer surface of the casing string 140 in an opposite direction than the conductive wire in adjacent casing-side antennas 122. In additional or alternative examples, the conductive wire for each of the casing-side antennas 122 is coiled around the casing string 140 in the same direction and the conductive wire is conductively coupled to a common antenna junction point such that adjacent casing-side antennas are conductively coupled in series and have opposite polarity such that the alternating current generated in each of the adjacent casing-side antennas travels in a different direction relative to the common antenna junction point. For example, current generated in a first one of the casing-side antennas 122 may travel towards the common antenna junction point in response to an electromagnetic field. Current generated on a second one of the casing-side antennas 122 that is adjacent to the first one of the casing-side antennas 122 can travel away from the common antennas junction point in response to the electromagnetic field.

In this example, the tubing string 104 uses three tubing-side antennas 110. In additional or alternative examples, only one tubing-side antenna may be used. Using more than one tubing-side antenna can extend the alignment range of the communication system to maintain communication with the casing-side sensor 130 despite shifts in the position of the tubing string 104 within the wellbore 102 relative to the casing string 140. In additional or alternative examples, one tubing-side antenna, two tubing-side antennas, or more than three tubing-side antennas, can be included in, or positioned on, a tubing string. The tubing string 104 is in a first position in the wellbore 102 in which one or more of the tubing-side antennas 110 are aligned with the casing-side antenna stack 120. Aligned with the casing-side antenna stack 120 can include one of the tubing-side antennas 110 being within range of one of the casing-side antennas 122 for communicating with the casing-side antenna stack 120, even if the one tubing-side antenna of the tubing-side antennas 110 is not physically aligned at the exact same radial position as the one casing-side antenna of the casing-side antennas 122.

The tubing string 104 can move in any direction in response to changes in pressure, temperature, or fluid flowing through the tubing string 104. For example, the tubing string 104 can respond to a change in temperature by shifting towards a surface of the wellbore 102 or away from the surface of the wellbore 102 to another position.

The cable 160 can communicatively couple each antenna of the tubing-side antennas 110 to a computing device for analyzing data measured by the casing-side sensor 130. Two or more of the tubing-side antennas 110 can be alignment-extension tubing-side antennas for maintaining communication with the casing-side antenna stack 120. Additional tubing-side antennas 110 can be positioned between the alignment-extension tubing-side antennas for providing redundancy.

Although FIG. 1 depicts the tubing string 104 with three tubing-side antennas 110, one tubing-side antenna, two tubing-side antennas, or more than three tubing-side antennas can be included in or positioned on a tubing string. Also, in some examples, one or more tubing-side antennas can be positioned on an inner surface of the tubing string 104 or embedded in the tubing string 104.

Although the wellbore 102 is depicted as a single vertical wellbore, other implementations are possible. For example, the tubing string 104 can be used in a wellbore including a deviated or horizontal portion. In some aspects, multiple casing-side sensors are used at various positions in a casing string. In some examples, each casing-side sensor can be communicatively coupled to a separate casing-side antenna stack. In additional or alternative examples, multiple casing-side sensors can be communicatively coupled to a single casing-side antenna stack.

Figure 2:
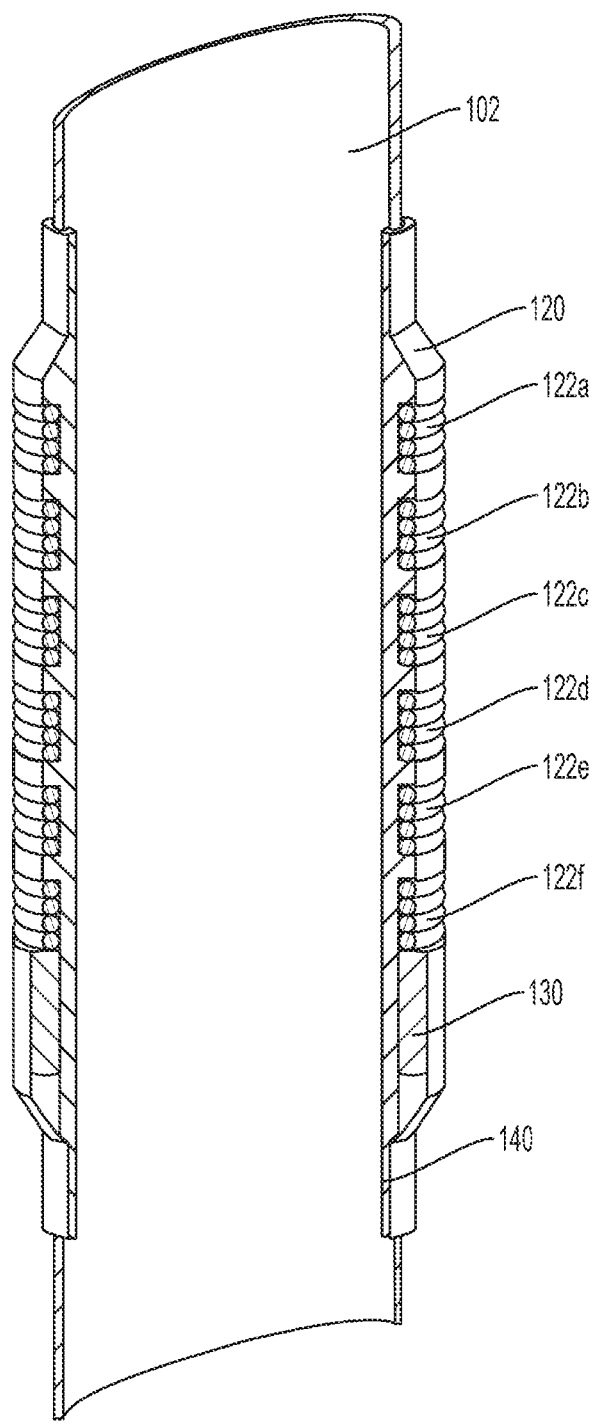
FIG. 2 is a cross-sectional diagram of an example of a casing string with multiple casing-side antennas according to one aspect of the present disclosure.

FIG. 2 is a cross-sectional diagram of an example of the casing string 140 in FIG. 1. The casing string 140 is positioned in wellbore 102 and includes the casing-side antenna stack 120 and the casing-side sensor 130. In this example, the casing-side antenna stack 120 can include casing-side antennas 122a-f. In other examples, any number of casing-side antennas can be included in the casing-side antenna stack 120. The casing-side antennas 122a-f can include conductive wire coiled around the casing string 140. In some examples, the casing-side antennas 122a-f include low conductivity non-magnetic materials. In some aspects, portions of the casing-side antennas 122a-f can be individually encapsulated or wholly encapsulated in non-metallic materials to allow electromagnetic communication with tubing-side antennas. For example, the casing-side antennas 122a-f can include conductive wire that is molded in an epoxy. The casing-side antennas 122a-f can be fully encapsulated in a metallic or non-metallic hermetically sealed encapsulation. In additional or alternative aspects, a low conductivity non-magnetic carrier or mandrel can be used for allowing low-loss communication of data and power between the casing-side antennas 122a-f and the tubing-side antennas 110a-c. The casing-side sensor 130 can include any suitable sensor for measuring characteristics of the subterranean formation or the wellbore 102. For example, the casing-side sensor can include one or more pressure sensors or temperature sensors, but other types of sensors or actuators can be used. In some examples, the casing-side sensor 130 can include shielding for protecting the sensors from electromagnetic fields generated by the antennas or the casing-side sensor 130 can be positioned remotely from the antennas.

Although FIGS. 1-2 depict the casing string 140 with a single casing-side antenna stack 120, a single casing-side sensor 130, and six casing-side antennas 122a-f, any number of casing-side components can be included in a casing string. For example, a casing string can include more than one casing-side antenna stack, which can each include one or more casing-side antennas and casing-side sensors. In FIGS. 1-2 the casing-side antennas 122a-f are depicted as being wrapped around an outer surface of the casing string 140, but other implementations are possible. In some aspects, a casing-side component can be positioned on an inner surface of a casing string or embedded in the casing string.

Figure 3:
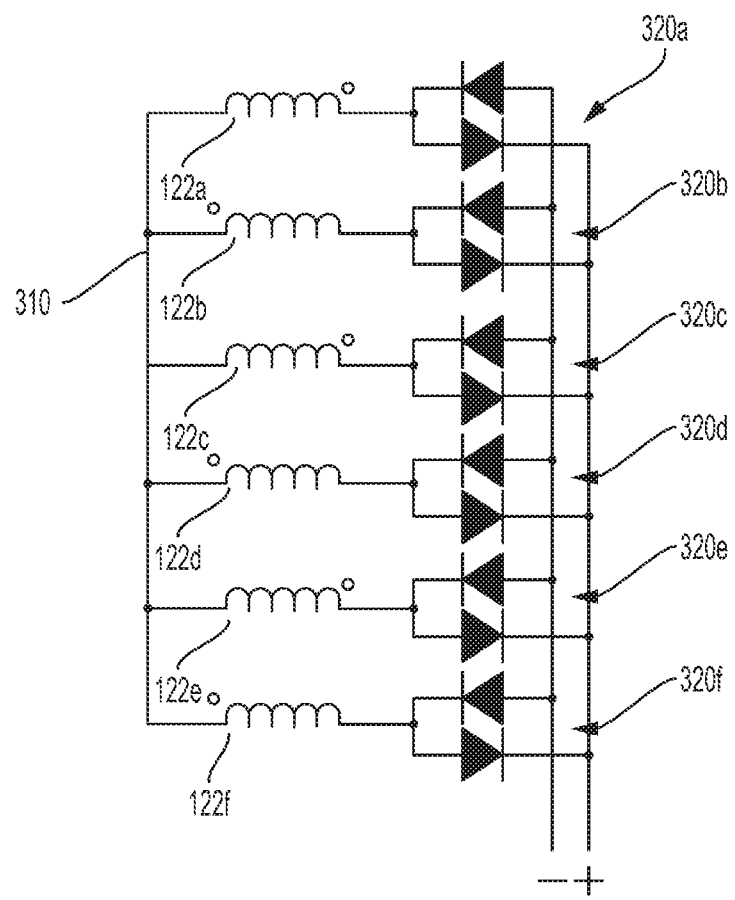
FIG. 3 is a schematic diagram of an example of an antenna system including adjacent antennas that share a full-wave rectifier according to one aspect of the present disclosure.

FIG. 3 is a schematic diagram of an example of the casing-side antennas 122a-f depicted in FIGS. 1-2 conductively coupled such that adjacent casing-side antennas share a full-wave rectifier. Although not depicted, a load (e.g., a casing-side sensor) can be coupled to a positive and a negative terminal conductively coupled to the casing side antennas 122a-f. Each of the casing-side antennas 122a-f includes one of the inductors. The inductors each include conductive wire coiled into loops and the inductors have a polarity based on the direction the conductive wire is coiled. Current can be induced on the inductors in response to an electromagnetic field from a tubing-side antenna. The direction of the current within one of the inductors is based on the polarity of the inductor and the direction of the electromagnetic field. Alternating the polarity of adjacent inductors can result in alternating direction of current, relative to a common antenna junction point 310 in the casing-side antennas 122a-f. In some examples, the conductive wire of adjacent inductors can be coiled in different directions around a casing string to form adjacent inductors with differing polarities. In additional or alternative examples, the inductors can be coiled in the same direction around a casing string and alternating the polarity of adjacent inductors can be caused by conductively coupling the opposite polarity ends of the adjacent inductors to the common antenna junction point 310. The casing-side antennas 122a-f can be conductively coupled to the common antenna junction point 310 such that adjacent casing-side antennas are conductively coupled in series. Conductively coupling adjacent casing-side antennas in series allows current to pass through both antennas and the voltage across each of the adjacent casing-side antennas to be additively combined.

In this example, casing-side antenna 122a and casing-side antenna 122b are adjacent. Adjacent casing-side antennas are conductively coupled such that opposite ends, based on polarity, of the inductors are connected together. Each casing-side antenna 122a-f is conductively coupled to (or in some examples can include) half of a full-wave rectifier 320a-f by conductively coupling the other end of the inductors to one of the halves of a full-wave rectifier 320a-f. In some aspects, current induced on adjacent casing side antennas 122a-b passes through (or is limited by) two halves of a full-wave rectifier 320a-b such that alternating current generated on the adjacent casing-side antennas 122a-b is converted to direct current prior to passing through a load connected to the positive and the negative terminals.

Sharing a full-wave rectifier (two halves) between adjacent casing-side antennas can reduce the number of diodes and wire junctions used in a casing-side antenna system by half compared to each casing-side antenna 122a-f including its own full-wave rectifier. Reducing the number of diodes and wire junctions can increase the reliability, reduce the cost, and reduce the size of casing-side antenna systems. In some examples, the diodes are mounted together with other electronics coupled to the casing-side sensor. Reducing the number of diodes can reduce the electromechanical feed-throughs for the wires passing through pressure barriers between the antenna encapsulation and the electronics. In some examples, reducing the size of components in a casing-side antenna systems can allow casing-side antenna systems to be placed in more secure housing or in portions of the casing string or wellbore previously too small to retain the components included in the casing-side antennas system.

Figure 4:
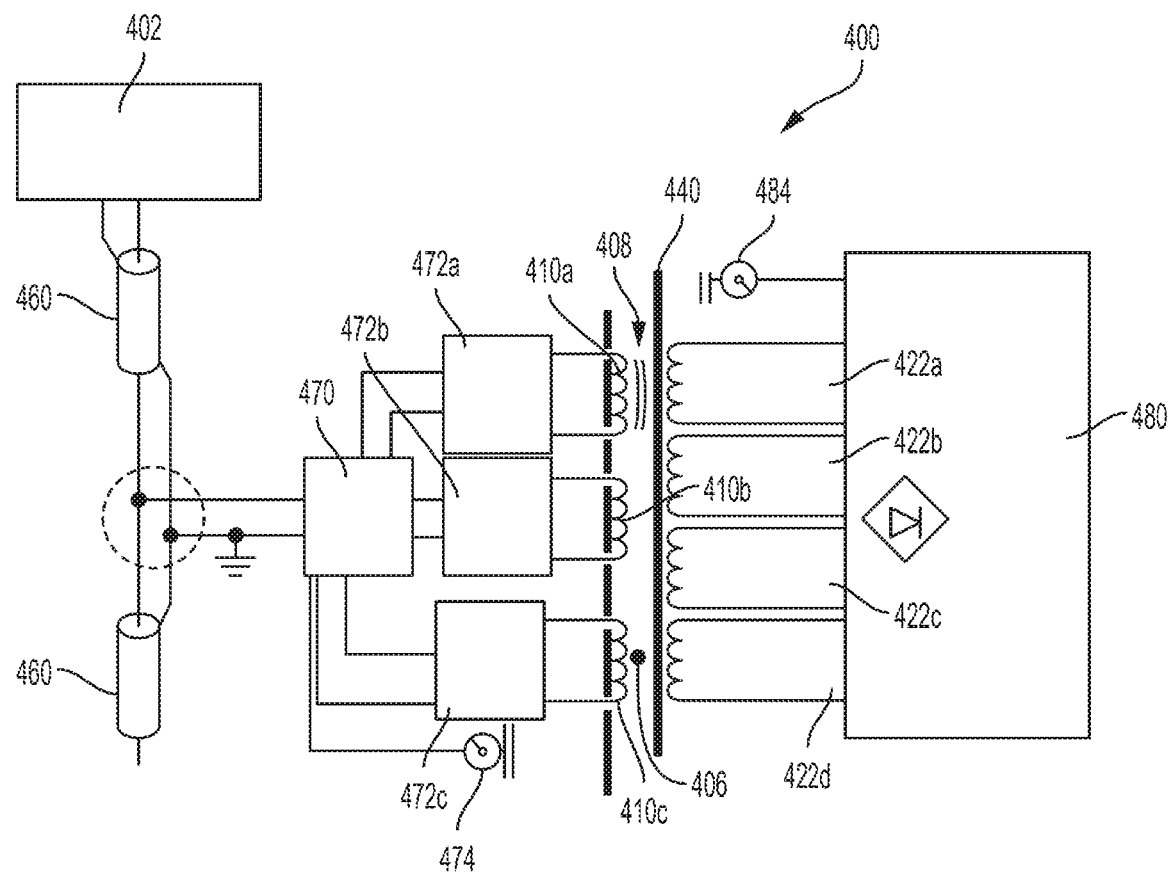
FIG. 4 is a schematic diagram of an example of an assembly with multiple casing-side antennas positioned to generate current in alternating directions for maintaining communication with multiple tubing-side antennas according to the one aspect of the present disclosure.

FIG. 4 is a schematic diagram of an example of an antenna system 400 with casing-side antennas 422a-d positioned and conductively coupled such that adjacent casing-side antennas generate current in opposite directions, relative to a common antenna junction point, in response to being in an electromagnetic field. The antenna system 400 further includes multiple tubing-side antennas 410a-c coupled to a tubing string and a casing-side sensor 484 coupled to a casing string 440. The antenna system 400 can further include a tubing-side antenna interface 470, tubing-side antenna drivers 472a-c, and a tubing-side sensor 474, which may be optional for obtaining measurements from within the casing string or outside of the tubing string. The antenna system 400 can further include casing-side electronics 480 (e.g., diodes that form full-wave rectifiers shared by adjacent casing-side antennas), a computing device 402, and a cable 460 that communicatively couples the computing device 402 to the tubing-side antenna interface 470.

Positioning and coupling the casing-side antennas 422a-d to generate current on adjacent casing-side antennas in opposite directions, relative to a common antenna junction point, can allow antenna system 400 to share full-wave rectifiers between adjacent casing-side antennas and reduce the number of casing-side electronics 480. In some aspects, alternating polarities of casing-side antennas 422a-d such that adjacent casing-side antennas have opposite polarities improves the efficiency of power transfer from the tubing-side antennas 410a-c to the casing-side sensor 484. In some examples, a higher voltage may be received by the casing-side antennas 422a-d allowing for the use of casing-side sensors with lower voltage tolerances. In additional or alternative examples, a higher output voltage can allow for the same power to be generated at a lower current, which can reduce losses.

In this example, one or more of tubing-side antennas 410a-c are within a communication range of one or more of the casing-side antennas 422a-d. An electromagnetic field 408 can be generated by tubing-side antenna 410a and transfer power, instructions, or both power and instructions to casing-side antenna 422a across gap 406 between the tubing string 404 and the casing string 440. The computing device 402 can transmit instructions to the tubing-side antenna interface 470 via cable 460. The tubing-side antenna interface 470 can be communicatively coupled to the tubing-side antenna driver 472a for causing the tubing-side antenna driver 472a to pass alternating current through conductive coil included in the tubing-side antenna 410a to generate the electromagnetic field 408.

Current can be generated on a conductive coil included in casing-side antenna 422a and a conductive coil included in casing-side antenna 422b. Since the electromagnetic field 408 is generated by passing alternating current through the conductive coil, the direction of the electromagnetic field will alternate over time and generate alternating current on each of the casing side antennas 422a-b. In some examples, the conductive coil in casing-side antenna 422a can be wound around the casing string 440 in a different direction than the conductive coil in casing-side antenna 422b such that the current induced at any given time on the conductive coil in casing-side antenna 422a is in a substantially opposite direction, relative to a common antenna junction point, from the current induced on the conductive coil in casing-side antenna 422b at the same time. Although the current is in a substantially opposite direction relative to a common antenna junction point, the casing-side antennas 422a-b can be conductively coupled such that the current passes through both casing-side antennas 422a-b and fed to the casing-side electronics 480.

In some examples, the casing-side electronics can include a full-wave rectifier. In additional or alternative examples, the current can be a modulated signal instructing the casing-side electronics 480 to cause the casing-side sensor 484 to take certain measurements. In additional or alternative examples, the current can be used to power the casing-side sensor 484 and the casing-side antennas 422a-b to cause data representing certain measurements to be transmitted back to the tubing-side antenna 410a. Tubing-side antenna 410c can provide a redundant communication path if an error occurs in tubing-side antennas 410a-b or their associated electronics.

Although the antenna system 400 in FIG. 4 has each tubing-side antenna 410a-c as communicatively coupled to one of the tubing-side antenna drivers 472a-c, other implementations are possible. For example, an antenna system can include a single tubing-side antenna driver in series with multiple tubing-side antennas for driving a current through the multiple tubing-side antennas. In some aspects, a tubing-side antenna driver and a tubing-side antenna interface can be included in a single tubing-side component.

Figure 5:
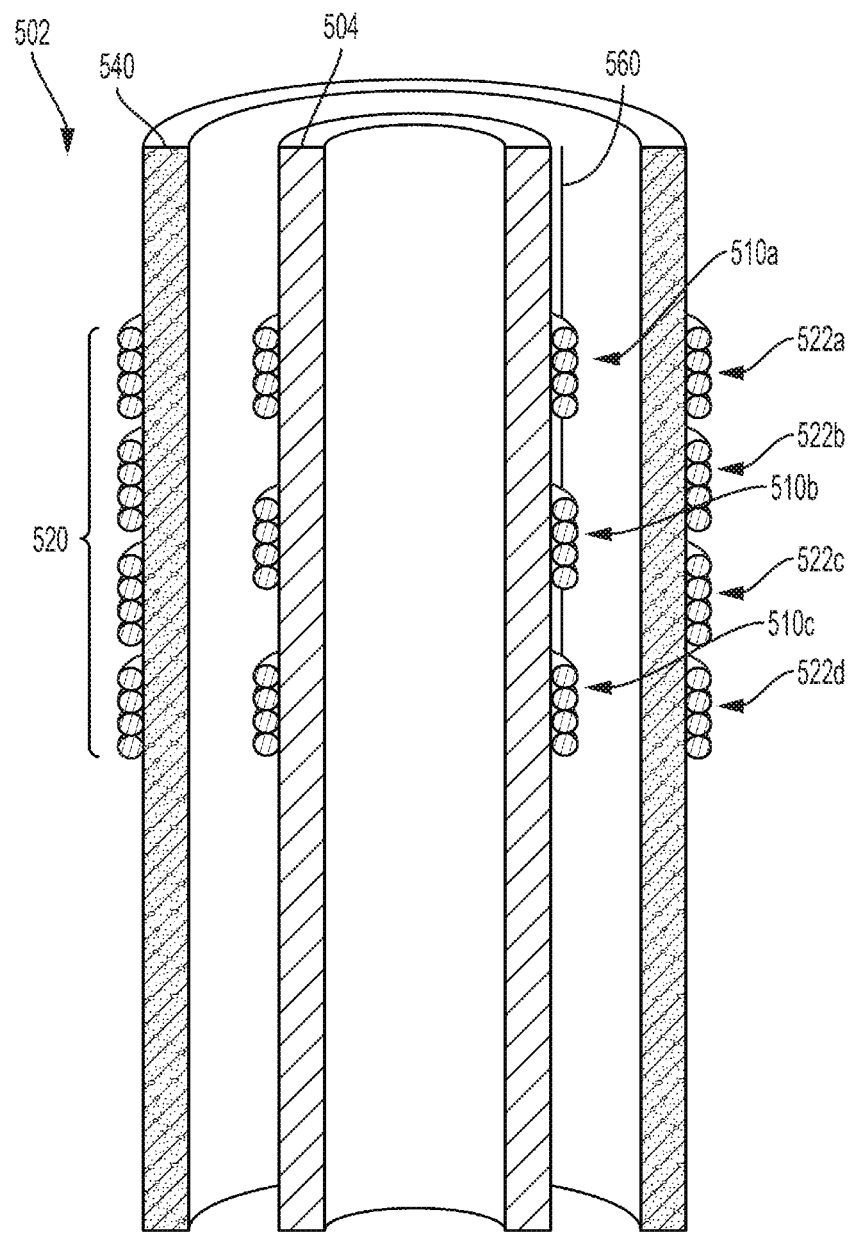
FIG. 5 is a cross-sectional diagram of an example of a tubing string with multiple tubing-side antennas positioned at a first position in a wellbore according to one aspect of the present disclosure.
Figure 6:
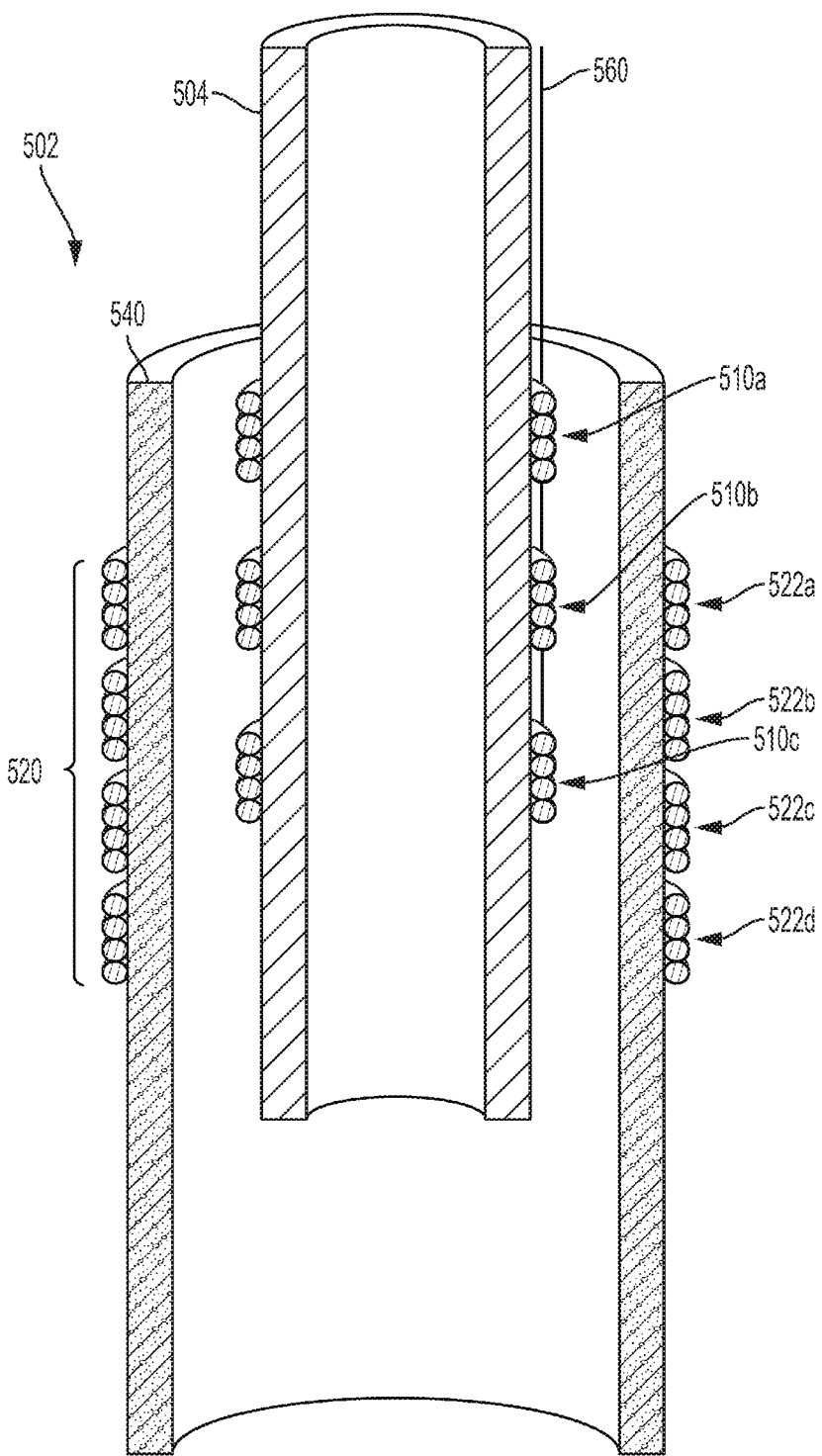
FIG. 6 is a cross-sectional diagram of an example of the tubing string in FIG. 5 positioned at a second position in the wellbore according to one aspect of the present disclosure.

FIGS. 5-6 are cross-sectional diagrams of an example of a casing string 540 with a casing-side antenna stack 520 positioned in a wellbore 502 for maintaining communication with one or more tubing-side antennas 510a-c coupled to a tubing string 504. The casing-side antenna stack 520 is mechanically coupled to the casing string 540 and includes casing-side antennas 522a-d. In this example, the tubing-side antennas 510a-c and the casing-side antennas 522a-d are depicted as single layer conductive coils with four loops, but any number of layers and loops may be implemented. For example, the tubing-side antennas 510a-c can include one or more layers of conductive wire in which a first layer is wrapped around the tubing string 504 and each subsequent layer is wrapped around a previous layer. In some examples, the casing-side antenna stack 520 is coupled to a casing-side sensor (not depicted) that can measure characteristics about a subterranean formation through which the wellbore 502 is formed. The tubing-side antennas 510a-c can maintain communication with the casing-side sensor via the casing-side antenna stack 520.

In some examples, the casing-side antenna stack 520 provides power to the casing-side sensor by generating current in response to an electromagnetic field from the tubing-side antennas 510a-c. In additional or alternative examples, the tubing-side antennas 510a-c receive signals that include data measured by the casing-side sensor from the casing-side antenna stack 520. The tubing-side antennas 510a-c are communicatively coupled to a cable 560 that can be communicatively coupled to a computing device (not depicted). The tubing-side antennas 510a-c can be communicatively coupled with electronics for transmitting a signal based on the signal received from the casing-side antenna stack 520 to the computing device via the cable 560. In some aspects, the electronics can include additional tubing-side sensors and the signal can include a combination of data representing measurements obtained by a casing-side sensor and data representing measurements obtained by a tubing-side sensor.

In FIG. 5, the tubing string 504 is positioned at a first position in the wellbore 502 defined by casing string 540. In this example, tubing-side antennas 510a-c are vertically aligned with the casing-side antenna stack 520 while the tubing string 504 is positioned at the first position. The casing-side antenna stack 520 is depicted with four casing-side antennas 522a-d, but any number of casing-side antennas can be included in the casing-side antennas stack 520. In this example, the tubing-side antenna 510b and the casing-side antenna stack 520 can be in a plane extending radially from a center of the tubing string 504. Tubing-side antenna 510b can be in communication range of one or more virtual antennas that include casing-side antenna 522a-d. In additional or alternative examples, the tubing-side antenna 510b can be a virtual tubing-side antenna that includes one or more physical tubing-side antennas.

In this example, casing-side antennas 522b-c are the closest casing-side antennas to tubing-side antenna 510b and may generate the highest magnitude current. Since casing-side antennas 522b-c are adjacent casing-side antennas and can work together as one antenna consisting of two coils with matching polarities, the current induced on casing-side antennas 522b-c can pass through a shared rectifier and the voltage induced across each of the casing-side antennas 522b-c can be additively combined. Casing-side antennas 522a and 522d are farther from the tubing-side antenna 510b and will generate a lower magnitude current. In this example, antennas 522a and 522d may not contribute with current to the load connected to the antenna system. Antennas 522a and 522d may contribute if the voltage generated by 522b is pulled down to the same level as the voltage from 522a or the voltage from 522c is pulled down to the same level as 522d. Voltage can be pulled down if the load on the direct current side of the full-wave rectifiers exceeds a threshold value.

In the example depicted in FIG. 5, the tubing-side antenna 510b can be a redundant tubing-side antenna for tubing-side antenna 510a, which can be an alignment-extension tubing-side antenna. A redundant tubing-side antenna can provide an alternative communication path. An alignment-extension tubing-side antenna can be positioned on the tubing string 504 at a predetermined distance from another alignment-extension tubing-side antenna to maintain communication with the casing-side antenna stack 520 despite movement of the tubing string 504. In this example, tubing-side antenna 510a and tubing-side antenna 510c are alignment-extension tubing-side antennas. In response to the tubing string 504 shifting towards the surface, tubing-side antenna 510a may move out of alignment and out of communication range with the casing-side antenna stack 520.

In FIG. 6, the tubing string 504 is positioned at a second position in the wellbore 502. Tubing-side antennas 510b-c are vertically aligned with the casing-side antenna stack 520 while the tubing string 504 is positioned at the second position such that tubing-side antennas 510b-c and casing-side antenna stack 520 are in a plane extending radially from a center of the tubing string. In this example, tubing-side antenna 510b can be in communication range of casing-side antenna 522a-b, and tubing-side antenna 510c can be in communication range of casing-side antennas 522a-d. The tubing-side antenna 510b can be a redundant tubing-side antenna for tubing-side antenna 510c, which can be an alignment-extension tubing-side antenna.

In some examples, a distance between non-redundant tubing-side antennas (e.g., tubing-side antenna 510a and tubing-side antenna 510c) can be less than or equal to a length of the casing-side antenna stack 520. The distance can be selected to ensure that as one of the tubing-side antennas 510a-c moves out of a communication range of the casing-side antenna stack 520, another one of the tubing-side antennas 510a-c moves into the communication range of the casing-side antenna stack 520.

Although FIGS. 5-6 depict a casing-side antenna stack with four casing-side antennas 522a-d, a casing-side antenna stack with alternating polarity of adjacent casing-side antennas can include two or more casing-side antennas. In some aspects, a portion of a casing-side antenna stack can be positioned on an inner surface of the casing string 540 or embedded within the casing string 540. In additional or alternative aspects, some tubing-side antennas can be positioned on an inner surface of the tubing string 504 or embedded within the tubing string 504. In additional or alternative aspects, more than one casing-side antenna stack can be included in a wellbore. In some examples, the tubing string 504 can be shifted even further toward a surface of the wellbore and maintain communication with tubing-side antenna 510c, even if redundancy is unavailable.

Figure 7:
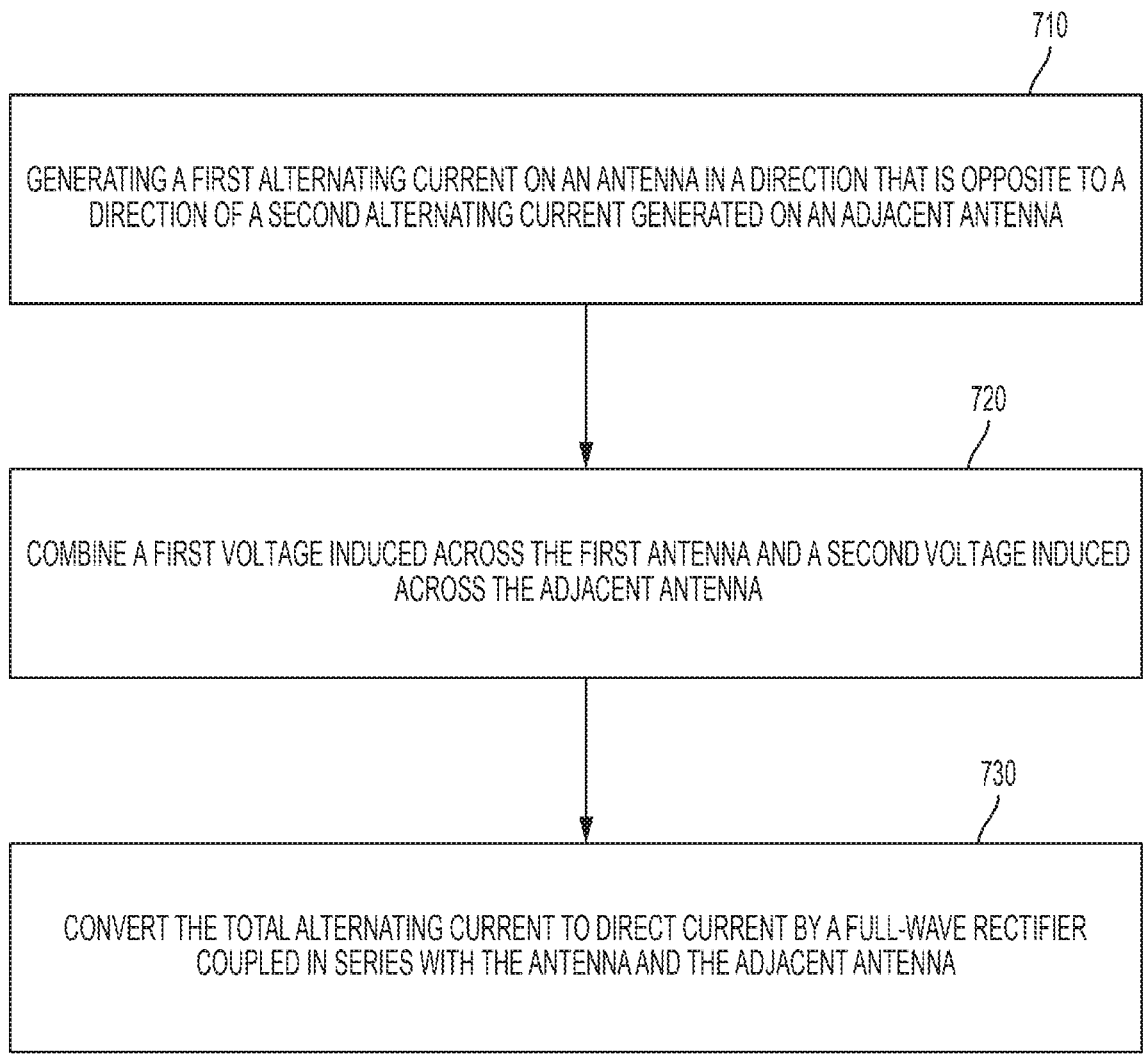
FIG. 7 is a flow chart of an example of a process for maintaining communication between a tubing-side antenna and a casing-side sensor in a wellbore using casing-side antennas with alternating polarity according to one aspect of the present disclosure.

FIG. 7 is a flow chart of an example of a process for maintaining communication between a tubing-side antenna and a casing-side sensor in a wellbore using alternating polarity casing-side antennas. Alternating the polarity of adjacent casing-side antennas can alternate direction, relative to a common antenna junction point, of current induced in adjacent casing-side antennas. Alternating the polarity of adjacent casing-side antennas can improve the transfer efficiency of signals between the tubing-side antenna and the casing-side sensor. In some examples, improving power transfer efficiency can allow for a greater number of casing-side sensors, more powerful casing-side sensors, casing-side sensors positioned deeper in a wellbore, and reduced power consumption.

In block 710, an antenna system generates a first alternating current in an antenna in a direction, relative to a common antenna junction point, that is opposite to a direction, relative to the common antenna junction point, of a second alternating current generated in an adjacent antenna. In some aspects, the antennas can be casing-side antennas that each include a conductive wire conductively coupled together at the common antenna junction point. The first alternating current and the second alternating current can be induced on conductive wire associated with each antenna in response to an electromagnetic field from a tubing-side antenna positioned in the wellbore. In some aspects, the antenna system generates the first alternating current through a first conductive wire coiled clockwise relative to a longitudinal axis of the casing string. The antenna system generates the second alternating current through second conductive wire coiled counter clockwise relative to the longitudinal axis of the casing string. In additional or alternative aspects, the antenna system generates the first alternating current and the second alternating current through two conductive wires each coiled in the same direction relative to the longitudinal axis and conductively coupled in series such that end of the conductive wire with opposite polarity are conductively coupled.

In block 720, an antenna system combines a first induced voltage across the antenna with a second induced voltage across the adjacent antenna. The first alternating current and the second alternating current form a total alternating current passing through the two antennas, which are conductively coupled in series. In some examples, the end of the first conductive wire can be conductively coupled directly to an end of the second conductive wire. Conductively coupling the two antennas in series can cause the first alternating current and the second alternating current to pass through both antennas and form a total alternating current. The voltage induced on each of the antennas is additively combined such that the voltage induced across the antennas is higher than across either individual antenna. The higher voltage and constant current causes the antennas to generate higher power compared to an antenna system in which the antennas are conductively coupled in parallel via full-wave rectifiers.

In block 730, an antenna system converts the total alternating current to direct current using a full-wave rectifier coupled in series with the antenna and the adjacent antenna. Since the total alternating current passes through both the antenna and the adjacent antenna, the antenna and adjacent antenna can share a full-wave rectifier. In some aspects, converting the total alternating current to direct current can include passing the total alternating current through a first portion of the full-wave rectifier conductively coupled directly to one end of the first conductive wire in response to the total alternating current being induced in a first direction. In additional or alternative aspects, converting the total alternating current to direct current can include passing the total alternating through a second portion of the full-wave rectifier conductively coupled directly to an end of the second conductive wire in response to the total alternating current being induced in a second direction.

Figure 8:
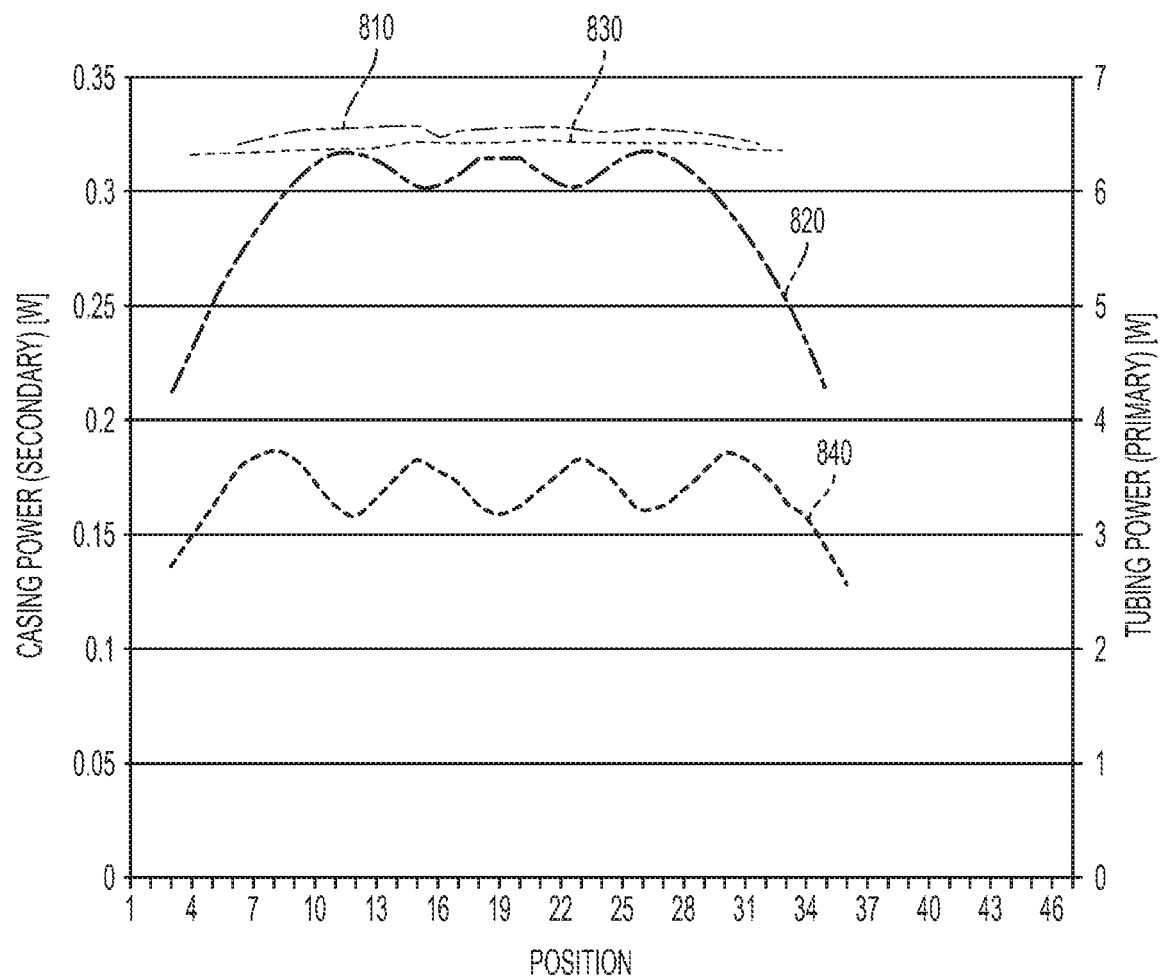
FIG. 8 is an example of a graph comparing power transfer between an antenna system with uniform polarity casing-side antennas and an antenna system with alternating polarity casing-side antennas according to one aspect of the present disclosure.

FIG. 8 is an example of a graph comparing input power 810, 830 provided to a tubing-side antenna and output power 820, 840 generated by casing-side antenna at 24 V and at various positions of the tubing-side antenna within the wellbore. The load for output power 820 and output power 840 is a real sensor behind an electronic linear voltage regulator. The graph shows doubled power rather than maximum power due to doubled voltage, a reduction of the amplitude of the dips, and a reduction in the number of dips. A ratio of the input power 810, 830 to output power 820, 840 can vary depending on physical and magnetic properties of the system. The input power 830 and output power 840 were measured on an antenna system that included independent full-wave rectifiers for each casing-side antenna, which generated current in each casing-side antenna in the same direction with a constant current load. The input power 810 and output power 820 were measured on an antenna system that included adjacent casing-side antennas sharing a full-wave rectifier and generating current in opposite directions as described herein. The output power 820 is higher than the output power 840 and includes fewer and shallower dips. Lower antenna losses due to higher output voltage (lower current for same power) can provide higher operating margins. In some aspects, shallower dips in casing-side voltage can allow the use of sensors less tolerant to input voltage variations in the antenna system. In some aspects, alternating direction of current in casing-side antennas in a wellbore is provided according to one or more of the following examples:

Example #1

An antenna system can include one or more antennas and a full-wave rectifier. The antennas can be coupled to a casing string that is positioned in a wellbore for communicatively coupling to a tubing-side antenna positioned in the wellbore. Each of the antennas can include a conductive wire positioned to carry current that is induced on the conductive wire in response to an electromagnetic field from the tubing-side antenna. The current can be in a direction, relative to a common antenna junction point, on the conductive wire that is opposite to the direction, relative to the common antenna junction point, in which an adjacent antenna is positioned to carry current induced in response to the electromagnetic field. The full-wave rectifier can be conductively coupled to the antennas for converting alternating current generated on the antennas into direct current.

Example #2

The antenna system of Example #1, further featuring the antennas including a first antenna and a second antenna. The first antenna including first conductive wire coiled clockwise relative to a longitudinal axis of the casing string. The second antenna including second conductive wire coiled counter clockwise relative to the longitudinal axis of the casing string. The second antenna being adjacent to the first antenna.

Example #3

The antenna system of Example #2, further featuring the second antenna being adjacent to the first antenna by the first antenna being positioned at a first longitudinal position along the casing string, the second antenna being positioned at a second longitudinal position along the casing string, and a distance between the first longitudinal position and the second longitudinal position being less than a length of the first antenna or the second antenna.

Example #4

The antenna system of Example #2, further featuring an end of the first conductive wire being conductively coupled to an end of the second conductive wire at the common antenna junction point such that the first antenna and the second antenna are conductively coupled in series.

Example #5

The antenna system of Example #4, further featuring the full-wave rectifier includes a first portion and a second portion. The first portion being conductively coupled directly to another end of the first conductive wire such that current induced on the second antenna passes through the first antenna prior to reaching the first portion. The second portion conductively coupled directly to another end of the second conductive wire such that current induced on the first antenna passes through the second antenna prior to reaching the second portion.

Example #6

The antenna system of Example #1, further featuring the antennas being conductively coupled to a casing-side sensor by the full-wave rectifier for providing power to the casing-side sensor in response to the electromagnetic field from the tubing-side antenna.

Example #7

The antenna system of Example #1, further featuring one or more of the antennas being coupled to an outer surface of the casing string.

Example #8

The antenna system of Example #1, further featuring the antennas including a first antenna and a second antenna. The first antenna including first conductive wire coiled in a first direction relative to a longitudinal axis of the casing string. The second antenna including second conductive wire coiled in a second direction relative to the longitudinal axis of the casing string. The second antenna being adjacent to the first antenna. The first conductive wire being conductively coupled directly to the second conductive wire at the common antenna junction point.

Example #9

An assembly including a casing string positioned in a wellbore in which a tubing-side antenna is positioned. The casing string can include one or more antennas, a full-wave rectifier, and a casing-side sensor. The antennas can communicatively couple to the tubing-side antenna. One of the antennas can include a conductive wire positioned to carry current that is induced on the conductive wire in response to an electromagnetic field from the tubing-side antenna and that is in a direction, relative to a common antenna junction point, on the conductive wire that is opposite to the direction, relative to the common antenna junction point, in which an adjacent antenna is positioned to carry current induced in response to the electromagnetic field. The full-wave rectifier can conductively couple to the antennas for converting alternating current generated on the antennas into direct current. The casing-side sensor can conductively couple to the full-wave rectifier for receiving direct current from the full-wave rectifier.

Example #10

The assembly of Example #9, further featuring the antennas including a first antenna and a second antenna. The first antenna can include first conductive wire coiled clockwise relative to a longitudinal axis of the casing string. The second antenna can include second conductive wire coiled counter clockwise relative to the longitudinal axis of the casing string. The second antenna being adjacent to the first antenna.

Example #11

The assembly of Example #10, further featuring the second antenna being adjacent to the first antenna by the first antenna being positioned at a first longitudinal position along the casing string, the second antenna being positioned at a second longitudinal position along the casing string, and a distance between the first longitudinal position and the second longitudinal position being less than a length of the first antenna or the second antenna.

Example #12

The assembly of Example #10, further featuring an end of the first conductive wire being conductively coupled to an end of the second conductive wire at the common antenna junction point such that the first antenna and the second antenna are conductively coupled in series.

Example #13

The assembly of Example #12, further featuring the full-wave rectifier including a first portion and a second portion. The first portion can be conductively coupled directly to another end of the first conductive wire such that current induced on the second antenna passes through the first antenna prior to reaching the first portion. The second portion can be conductively coupled directly to another end of the second conductive wire such that current induced on the first antenna passes through the second antenna prior to reaching the second portion.

Example #14

The assembly of Example #9, further including a tubing string and a tubing-side antenna coupled thereto for positioning the tubing string in the wellbore.

Example #15

The assembly of Example #9, further featuring one or more of the antennas being coupled to an outer surface of the casing string.

Example #16

The assembly of Example #9, further featuring the antennas including a first antenna and a second antenna. The first antenna including first conductive wire coiled in a first direction relative to a longitudinal axis of the casing string. The second antenna including second conductive wire coiled in a second direction relative to the longitudinal axis of the casing string. The second antenna being adjacent to the first antenna. The first conductive wire being conductively coupled directly to the second conductive wire at the common antenna junction point.

Example #17

A method can include generating a first alternating current on an antenna coupled to a casing string positioned in a wellbore. The first alternating current can be induced on a conductive wire included in the antenna in response to an electromagnetic field from a tubing-side antenna. The first alternating current can be in a direction, relative to a common antenna junction point, that is opposite to a direction, relative to the common antenna junction point, of a second alternating current generated on an adjacent antenna in response to the electromagnetic field. The first alternating current and the second alternating current can form a total alternating current. The method can further include combining a first voltage induced across the antenna with a second voltage induced on the adjacent antenna to form a total voltage. The total voltage can be greater than the first voltage or the second voltage. The method can further include converting the total alternating current to direct current by a full-wave rectifier conductively coupled in series with the antenna and the adjacent antenna.

Example #18

The method Example #17, further featuring generating the first alternating current including generating a first alternating current through first conductive wire coiled clockwise relative to a longitudinal axis of the casing string. Generating the first alternating current can further include generating the second alternating current through second conductive wire coiled counter clockwise relative to the longitudinal axis of the casing string. The end of the first conductive wire can be conductively coupled directly to an end of the second conductive wire.

Example #19

The method of Example #18, further featuring converting the total alternating current to direct current including passing the total alternating current through a first portion of the full-wave rectifier conductively coupled directly to another end of the first conductive wire in response to the total alternating current moving from the second conductive wire to the first conductive wire. Converting the total alternating current to direct current can further include passing the total alternating current through a second portion of the full-wave rectifier conductively coupled directly to another end of the second conductive wire in response to the total alternating current moving from the first conductive wire to the second conductive wire.

Example #20

The method of Example #17, further including providing direct current to a casing-side sensor in response to the electromagnetic field from the tubing-side antenna.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An antenna system comprising:
at least three antennas coupleable to a casing string that is positionable in a wellbore for communicatively coupling to a tubing-side antenna positioned in the wellbore, each antenna of the at least three antennas including a conductive wire positioned to carry current that is induced on the conductive wire in response to an electromagnetic field from the tubing-side antenna, wherein at least two antennas of the at least three antennas are arranged in series with a same polarity, wherein at least two antennas of the at least three antennas are arranged in parallel with an opposite polarity, and wherein each antenna of the at least three antennas comprises a common antenna junction point; and a full-wave rectifier conductively coupled to the at least three antennas for converting alternating current generateable on the at least three antennas into direct current.

2. The antenna system of claim 1, wherein the at least three antennas comprises:
 a first antenna including first conductive wire coiled clockwise relative to a longitudinal axis of the casing string; and
 a second antenna including second conductive wire coiled counter clockwise relative to the longitudinal axis of the casing string, the second antenna being adjacent to the first antenna.

3. The antenna system of claim 2, wherein the second antenna being adjacent to the first antenna includes the first antenna being positioned at a first longitudinal position along the casing string, the second antenna being positioned at a second longitudinal position along the casing string, and a distance between the first longitudinal position and the second longitudinal position being less than a length of the first antenna or the second antenna.

4. The antenna system of claim 2, wherein an end of the first conductive wire is conductively coupled to an end of the second conductive wire at the common antenna junction point such that the first antenna and the second antenna are conductively coupled in series.

5. The antenna system of claim 4, wherein the full-wave rectifier comprises:
 a first portion conductively coupled directly to another end of the first conductive wire such that current induced on the second antenna passes through the first antenna prior to reaching the first portion; and
 a second portion conductively coupled directly to another end of the second conductive wire such that current induced on the first antenna passes through the second antenna prior to reaching the second portion.

6. The antenna system of claim 1, wherein the at least three antennas are conductively coupleable to a casing-side sensor by the full-wave rectifier for providing power to the casing-side sensor in response to the electromagnetic field from the tubing-side antenna.

7. The antenna system of claim 1, wherein at least one antenna of the at least three antennas is coupleable to an outer surface of the casing string.

8. The antenna system of claim 1, wherein the at least three antennas comprises:
 a first antenna including first conductive wire coiled in a first direction relative to a longitudinal axis of the casing string; and
 a second antenna including second conductive wire coiled in a second direction relative to the longitudinal axis of the casing string, the second antenna being adjacent to the first antenna, the first conductive wire conductively coupled directly to the second conductive wire at the common antenna junction point.

9. An assembly comprising:
 a casing string positionable in a wellbore in which a tubing-side antenna is positionable, the casing string comprising:
  at least three antennas for communicatively coupling to the tubing-side antenna, each antenna of the at least three antennas including a conductive wire positioned to carry current that is induced on the conductive wire in response to an electromagnetic field from the tubing-side antenna, wherein at least two antennas of the at least three antennas are arranged in series with a same polarity, wherein at least two antennas of the at least three antennas are arranged in parallel with an opposite polarity, and wherein each antenna of the at least three antennas comprises a common antenna junction point;
  a full-wave rectifier conductively coupled to the at least three antennas for converting alternating current generateable on the at least three antennas into direct current; and
  a casing-side sensor conductively coupled to the full-wave rectifier for receiving direct current from the full-wave rectifier.

10. The assembly of claim 9, wherein the at least three antennas comprises:
 a first antenna including first conductive wire coiled clockwise relative to a longitudinal axis of the casing string; and
 a second antenna including second conductive wire coiled counter clockwise relative to the longitudinal axis of the casing string, the second antenna being adjacent to the first antenna.

11. The assembly of claim 10, wherein the second antenna being adjacent to the first antenna includes the first antenna being positioned at a first longitudinal position along the casing string, the second antenna being positioned at a second longitudinal position along the casing string, a distance between the first longitudinal position and the second longitudinal position being less than a length of the first antenna or the second antenna.

12. The assembly of claim 10, wherein an end of the first conductive wire is conductively coupled to an end of the second conductive wire at the common antenna junction point such that the first antenna and the second antenna are conductively coupled in series.

13. The assembly of claim 12, wherein the full-wave rectifier comprises:
 a first portion conductively coupled directly to another end of the first conductive wire such that current induced on the second antenna passes through the first antenna prior to reaching the first portion; and
 a second portion conductively coupled directly to another end of the second conductive wire such that current induced on the first antenna passes through the second antenna prior to reaching the second portion.

14. The assembly of claim 9, further comprising a tubing string and a tubing-side antenna coupled thereto for positioning the tubing string in the wellbore.

15. The assembly of claim 9, wherein at least one antenna of the at least three antennas is coupleable to an outer surface of the casing string.

16. The assembly of claim 9, wherein the at least three antennas comprises:
 a first antenna including first conductive wire coiled in a first direction relative to a longitudinal axis of the casing string; and
 a second antenna including second conductive wire coiled in a second direction relative to the longitudinal axis of the casing string, the second antenna being adjacent to the first antenna, the first conductive wire conductively coupled directly to the second conductive wire at the common antenna junction point.

17. A method comprising:

generating a first alternating current on an antenna of the at least three antennas coupled to a casing string positioned in a wellbore, the first alternating current induced on a conductive wire included in the antenna in response to an electromagnetic field from a tubing-side antenna, wherein at least two antennas of the at least three antennas are arranged in series with a same polarity, wherein at least two antennas of the at least three antennas are arranged in parallel with an opposite polarity, wherein each antenna of the at least three antennas comprises a common antenna junction point, and wherein a second antenna of the at least three antennas generates a second alternating current in response to the electromagnetic field, the first alternating current and the second alternating current forming a total alternating current;

combining a first voltage induced across the antenna with a second voltage induced on the second antenna to form a total voltage, the total voltage being greater than the first voltage or the second voltage; and converting the total alternating current to direct current by a full-wave rectifier conductively coupled in series with the antenna and the second antenna.

18. The method of claim 17, wherein generating the first alternating current comprises:

generating a first alternating current through first conductive wire coiled clockwise relative to a longitudinal axis of the casing string; and generating the second alternating current through second conductive wire coiled counter clockwise relative to the longitudinal axis of the casing string, wherein an end of the first conductive wire is conductively coupled directly to an end of the second conductive wire.

19. The method of claim 18, wherein converting the total alternating current to direct current comprises:

passing the total alternating current through a first portion of the full-wave rectifier conductively coupled directly to another end of the first conductive wire in response to the total alternating current moving from the second conductive wire to the first conductive wire; and passing the total alternating current through a second portion of the full-wave rectifier conductively coupled directly to another end of the second conductive wire in response to the total alternating current moving from the first conductive wire to the second conductive wire.

20. The method of claim 17, further comprising providing direct current to a casing-side sensor in response to the electromagnetic field from the tubing-side antenna.

* * * * *